Patented Aug. 2, 1949

2,478,099

UNITED STATES PATENT OFFICE 2,478,099

PROCESS FOR COMPOUNDING AND TREATING DOUGH FOR BAKED PRODUCTS

John Joseph Hennessy, Fairhaven, Mass.

No Drawing. Application January 15, 1947, Serial No. 722,295

1 Claim. (Cl. 99—90)

This invention relates to a new process for compounding and treating dough for baked products.

It is an object of this invention to increase the volume of the baked product, to give it a better color (whiter), to give it a softer and smoother texture, to sweeten it a little without the addition of foreign sugar, and to obtain all of these advantages without the loss of flavor.

A further object of this invention is to have the baked product retain its softness and freshness for a longer period of time.

Another object of this invention is to make the baked product more rapidly and completely digestible.

The objects of this invention may be better understood by realizing that staling of bread and other baked products is a chemical change not merely involving the loss of moisture to the surrounding atmosphere. This has been proven by tests in which the baked products were sealed in cans and in which they nevertheless became stale, hard and crumbly. Of course when the baked product is protected from the atmosphere with a wrapper the time of staling is reduced, thought not stopped.

The reason for this is that in the process of staling there is a loss of moisture from the starch to other components, thus causing the objectionable staleness. During baking of the product the starch gelatinizes somewhat but not as completely and in the same way as if separately treated. Staling will be materially reduced if such a more complete gelatinization treatment can be given the starch component of all or some of the flour used in baking.

The characteristic feature of this invention resides in treating the starch component of dough by heating and/or by chemical cooking to break up the starch grains, or to hydrolize them for obtaining the objects of this invention. The processed starch is reincorporated with the dough and then the baked product is made in the usual way from the dough by proceeding with or without leavening, and then proofing and baking.

For further comprehension of the invention, and of the objects and advantages thereof, reference will be had to the following description, and to the appended claim in which the various novel features of the invention are more particularly set forth.

The following examples are given to illustrate the invention.

EXAMPLE I

*Formula of ingredients required for compounding and treating dough for baked products*

| | Pounds |
|---|---|
| Flour | 100 |
| Water | 260 |

The hundred pounds of flour is first mixed with sixty pounds of water in a mixing machine or by hand, to make a homogeneous dough mass. Then the dough mass is mixed, by hand or in a mixing machine, with two hundred pounds of water to wash out the starch from the gluten mass. The starch forms a colloidal suspension in the excess water. The dough-like gluten which has been broken up by the mixing machine, or by hand mixing, is present in small globules which are collected into a single mass.

The starch grains in the colloidal suspension are now broken up (hydrolized) for improving the quality of the baked product. This breaking up of the grains is accomplished by the application of heat. The colloidal suspension may be heated from 150° F. to 300° F., under pressure as needed. At this point it may be well to point out that, if desired, some of the moisture of the colloidal suspension which was added to effect the separation of the starch from the gluten, may be driven off before the application of heat for hydrolizing the starch grains.

The processed colloidal suspension is now concentrated by driving off all excessive moisture. This may be done by heat application, centrifugal force methods or by a combination of these and other methods. Approximately 80% of the water should be removed, leaving about forty seven pounds of concentrated starch colloidal suspension. This concentrate is now added to the gluten portion of the dough and thoroughly mixed to form a dough of proper consistency for use in baking.

It should be recognized that only the starch component of the dough has been processed. The process could not be administered to the entire original mass of dough because the gluten would be damaged. Its toughness, elasticity and pliability would be adversely affected.

By processing the starch component separately of the protein component, starch grains are broken up and/or hydrolized more completely. It is for this reason that the finished baked product will retain its softness and freshness for a longer period of time. The generally accepted basic idea of staling of baked products is that the starch loses its ability to hold moisture after the baked product is baked and that this loss of moisture from the starch to either the protein portion or merely into the intraspaces in the baked product, causes the crumb to become "horney," apparently dry and crumbly. When the starch component is more completely gelatinized its affinity for moisture is increased and it will hold its moisture more firmly after baking. Moreover, the broken up and hydrolized grains of starch makes mixing with enzymes more perfect and digestion more rapid and complete. It should also be noted that the gluten component of the dough has not been diluted with excessive starch, that is, no additional starch has been added to the dough which was not present in the original flour. Since the leavening of dough is dependent upon the protein concentrate, which has not been diluted, the baked product will have an increased volume which is highly desirable. Moreover, since the starch component has been at least partially hydrolized, the partially hydrolized starch will contain dextrins and sugar. The former will be more readily converted to sugars during fermentation than would be the case without such treatment thus creating a sweeter baked product and making it unnecessary to add as much, or any, sugar and malt as extra ingredients.

It is particularly pointed out that the one hundred pounds of flour was not mixed with the two hundred and sixty pounds of water, because if this were done the flour would form a paste and we could not separate the starch and gluten components. By making a dough using one hundred pounds of flour and sixty pounds of water it is then possible to add the additional two hundred pounds of water to wash out the starch component from the gluten mass.

EXAMPLE II

The same as Example I but in which the starch colloidal suspension is heated to boiling and made slightly acid by addition of small quantities of an acid such as hydrochloric to cause a more complete hydrolization resulting in more conversion to sugar. The starch suspension containing the added acid may then be treated with an alkali such as sodium bicarbonate.

It should be noted that in both of the above examples the starch was hydrolized which increases its affinity for water and causes it to hold it more firmly after baking. The baked product will therefore remain softer and fresher for a longer period of time. The baked product will also have the advantages stated in the objects of this specification.

Furthermore it should be understood that not all of the flour to be used in the production of the baked product would necessarily need to be treated in accordance with this invention. It is quite likely that if only a portion of the flour received the treatment there would be an appreciable improvement in the baked product, and the actual operation would be greatly simplified since not as much water would have to be removed from the starch suspension, in this case, due to the need of additional moisture by the untreated flour which might be introduced.

While I have described the preferred embodiments of my invention, it is to be understood that I do not limit myself to the precise examples herein disclosed and the right is reserved to all changes and modifications coming within the scope of the invention as defined in the appended claim.

Having thus described my invention, what I claim as new and desire to secure by United States Letters Patent is:

A process for compounding and treating dough for baked products from an initial quantity of flour without using extraneous ingredients except water, which consists in mixing said flour with a quantity of water sufficient to make a dough, washing the starch out from said dough with a sufficient quantity of water to make a colloidal suspension of said starch in said water, hydrolizing the starch grains in said suspension for improving the quality of the baked products, removing a sufficient quantity of water from said suspension so that the concentrated liquid may be added to said dough to make a dough of proper consistency for baking, and mixing said concentrated liquid with said dough in order that the dough contains no extraneous ingredients not originally contained in said flour except water.

JOHN JOSEPH HENNESSY.

REFERENCES CITED

The following references are of record in the file of this patent:

UNITED STATES PATENTS

| Number | Name | Date |
| --- | --- | --- |
| 1,215,995 | Roworth | Feb. 13, 1917 |
| 1,258,793 | Lovelace | Mar. 12, 1918 |
| 1,411,192 | Schenk | Mar. 28, 1922 |
| 1,411,203 | Bright | Mar. 28, 1922 |
| 1,576,664 | Lindsay et al. | Mar. 16, 1926 |
| 1,733,574 | Block | Oct. 29, 1929 |

FOREIGN PATENTS

| Number | Country | Date |
| --- | --- | --- |
| 773 | Great Britain | 1883 |
| 4,370 | Great Britain | 1902 |

OTHER REFERENCES

Eynon and Lane; Starch, W. Heffer & Sons Ltd., Cambridge (1928) pp. 144, 145.